(12) United States Patent
Ito et al.

(10) Patent No.: US 8,632,871 B2
(45) Date of Patent: *Jan. 21, 2014

(54) FILM FOR PRODUCING A SHEET FOR A MULTILAYER OPTICAL RECORDING MEDIUM

(71) Applicant: LINTEC Corporation, Tokyo (JP)

(72) Inventors: Masaharu Ito, Kawaguchi (JP); Shinichi Hoshi, Saitama (JP); Ryo Takahashi, Koshigaya (JP); Sou Miyata, Matsudo (JP); Tomoo Orui, Saitama (JP); Takeshi Kondo, Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,426

(22) Filed: Mar. 5, 2013

(65) Prior Publication Data

US 2013/0196115 A1    Aug. 1, 2013

Related U.S. Application Data

(62) Division of application No. 12/999,304, filed as application No. PCT/JP2009/061267 on Jun. 15, 2009, now Pat. No. 8,420,199.

(30) Foreign Application Priority Data

Jun. 17, 2008  (JP) ................................ 2008-157515

(51) Int. Cl.
G11B 7/24      (2013.01)
(52) U.S. Cl.
USPC ..................... 428/64.1; 428/64.4; 430/270.11

(58) Field of Classification Search
USPC ..................................... 428/64.4; 430/270.11
See application file for complete search history.

(56) References Cited

U.S. PATENT DOCUMENTS

| 2005/0142318 | A1 | 6/2005 | Nakabayashi et al. |
| 2005/0167865 | A1 | 8/2005 | Mizushima et al. |
| 2009/0046567 | A1 | 2/2009 | Hisada et al. |

FOREIGN PATENT DOCUMENTS

| EP | 1 930 172 A1 | 6/2008 |
| JP | 11-250496 A | 9/1999 |

(Continued)

OTHER PUBLICATIONS

International Search Report for PCT/JP2009/061267 mailed Aug. 4, 2009.

(Continued)

*Primary Examiner* — Elizabeth Mulvaney
(74) *Attorney, Agent, or Firm* — Holtz Holtz Goodman & Chick PC (57) ABSTRACT

A film for producing a sheet for a multilayer optical recording medium, the sheet having a repeating structure containing a plurality of laminated optical recording layers, the sheet has a structure including a unit wherein an optical recording layer and an adhesive layer are laminated or a structure including a unit wherein an optical recording layer, a barrier layer and an adhesive layer are laminated, and a maximum height roughness of the optical recording layer or the barrier layer is 500 nm or smaller, the optical recording layer or the barrier layer is disposed on a process film on a face at a side for forming the optical recording layer or at a side for forming the barrier layer, the face at the side for forming the optical recording layer or at the side for forming the barrier layer having a maximum height roughness of 500 nm or smaller.

16 Claims, 3 Drawing Sheets

(56) References Cited

FOREIGN PATENT DOCUMENTS

| | | |
|---|---|---|
| JP | 2000-067464 A | 3/2000 |
| JP | 2001-325751 A | 11/2001 |
| JP | 2005-209328 A | 8/2005 |
| JP | 2005-285211 A | 10/2005 |
| JP | 2006-277809 A | 10/2006 |
| JP | 2008-108381 | 5/2008 |
| JP | 2008-135101 A | 6/2008 |
| TW | 200302474 A | 8/2003 |
| WO | WO 2007/049544 A1 | 5/2007 |

OTHER PUBLICATIONS

English-language translation of Japanese Office Action (Notification of Reasons for Rejection) mailed on Jun. 18, 2013 for Japanese application JP 2010-517989.

Search Report for Taiwanese Application No. 098120010 dated Oct. 9, 2013.

FILM FOR PRODUCING A SHEET FOR A MULTILAYER OPTICAL RECORDING MEDIUM

CROSS-REFERENCE TO RELATED APPLICATIONS

This application is a divisional application of application Ser. No. 12/999,304 filed Dec. 15, 2010 (U.S. Pat. No. 8,420, 199), which is a United States national phase application under 35 USC 371 of International application PCT/JP2009/061267 filed Jun. 15, 2009. The entire contents of each of application Ser. No. 12/999,304 and International application PCT/JP2009/061267 are hereby incorporated by reference herein.

TECHNICAL FIELD

The present invention relates to a sheet for a multilayer optical recording medium and a multilayer optical recording medium using the same. More particularly, the present invention relates to a sheet for producing a multilayer optical recording medium having a repeating structure in which a plurality of optical recording layers are laminated with excellent precision and quality, and a multilayer optical recording medium produced by using the sheet.

BACKGROUND ART

Recently, multilayer optical recording media utilizing two-photon absorbing materials are proposed to increase the density of recorded information in the optical recording media. To decrease crosstalk in the multilayer optical recording media, a structure in which a non-recording layer is disposed between recording layers is proposed (for example, refer to Patent References 1 and 2). However, the multilayer optical recording media having the laminate structure described above are, in general, obtained by forming and laminating each layer by the spin coating process, and a problem arises in that maintaining the precision of the thickness of the film is difficult since the error of the thickness increases as the lamination is repeated.

As a method for overcoming the problem, for example, a process in which a sheet of a thin film of a non-recording layer constituted with a pressure sensitive adhesive is attached to a substrate plate, a recording layer having a smaller thickness is formed on the non-recording layer by a coating process such as a spin coating process or a knife coating process, and these procedures are repeated to form the desired number of laminated layers, may be conducted. In this case, in general, a barrier layer is formed between the pressure sensitive adhesive layer and the optical recording layer since resistance of the pressure sensitive adhesive to solvents is poor. The two-photon absorbing material used for the recording layer is frequently a low molecular compound, and the strength of a sheet is insufficient when the sheet is formed from the material. To overcome this problem, in general, a binder polymer exhibiting poor two-photon absorbing property is mixed as the matrix. However, this method decreases the recording sensitivity as the recording layer.

As another process, a process in which a sheet of a thin film of a recording layer constituted with a two-photon absorbing material and a sheet of a thin film of a non-recording layer constituted with a pressure sensitive adhesive are laminated, is proposed (for example, refer to Patent Reference 3). In accordance with the process using the above sheet, several layers can be laminated to the substrate plate in a single step by preparing a unit in which several sheets of a thin film of a recording layer and several sheets of a thin film of a non recording layer are laminated, and production of a multilayer optical recording medium can be facilitated.

[Patent Reference 1] Japanese Patent Application Laid-Open No. Heisei 11 (1999)-250496
[Patent Reference 2] Japanese Patent Application Laid-Open No. 2000-67464
[Patent Reference 3] Japanese Patent Application Laid-Open No. 2005-209328

DISCLOSURE OF THE INVENTION

Problems to be Overcome by the Invention

The processes described in Patent Reference 3 has a problem in that the roughness of the process film is transferred to the extremely thin recording layer or the barrier layer for forming an extremely thin recording layer having a thickness as small as 10 to 5,000 nm, and scattering of light takes place due to the roughness although the multilayer optical recording medium can be prepared easily. Since a filler such as silica is added to commercial films such as polyethylene terephthalate films to prevent blocking or the like, the roughness of the process film is transferred to the recording layer or the barrier layer and it is difficult that scattering of light is prevented as long as the film described above is used as the process film. When a process film is coated with a coating fluid containing a material for forming a recording layer or a material for forming a barrier layer used for forming the recording layer, problems arises in that separation of the recording layer or the barrier layer from the process film become difficult since a portion of the material migrates into the process film and that, when the material forming the recording layer is a mixture, some components selectively migrate into the process film and, as a result, the composition of the obtained recording layer is different from the prescribed composition.

The present invention has been made under the above circumstance and has an object of providing a sheet for producing a multilayer optical recording medium having a repeating structure, in which a plurality of optical recording layers comprising the multiphoton absorbing material are laminated, with excellent precision and quality, and a multilayer optical recording medium produced by using the sheet.

Means for Overcoming the Problems

As the result of intensive studies by the present inventors to achieve the above object, it was found the object could be achieved by using a sheet which had a structure comprising a unit in which an optical recording layer and an adhesive layer were laminated or a structure comprising a unit in which an optical recording layer, a barrier layer and an adhesive layer were laminated in this order and had the maximum height roughness (Rz) of the optical recording layer or the barrier layer limited to a specific value or smaller. The present invention has been completed based on the knowledge.

The present invention provides:
[1] A sheet for a multilayer optical recording medium having a repeating structure comprising a plurality of laminated optical recording layers, wherein the sheet has a structure comprising a unit in which an optical recording layer and an adhesive layer are laminated or a structure comprising a unit in which an optical recording layer, a barrier layer and an adhesive layer are laminated in this order, and a maximum height roughness (Rz) of the optical recording layer or the barrier layer is 500 nm or smaller;

[2] The sheet for a multilayer optical recording medium according to [1], wherein, in the sheet having a structure comprising a unit in which an optical recording layer and an adhesive layer are laminated, the optical recording layer is formed by transfer of an optical recording layer formed on a process film on a face at a side for forming the optical recording layer, the face at the side for forming the optical recording layer of the process film having a maximum height roughness (Rz) of 500 nm or smaller;

[3] The sheet for a multilayer optical recording medium according to [1], wherein, in the sheet having a structure comprising a unit in which an optical recording layer, a barrier layer and an adhesive layer are laminated, the barrier layer is formed by transfer of a barrier layer formed on a process film on a face at a side for forming the barrier layer, the face at the side for forming the barrier layer of the process film having a maximum height roughness (Rz) of 500 nm or smaller;

[4] The sheet for a multilayer optical recording medium according to any one of [2] and [3], wherein surface film Young's modulus on the face of the process film at the side for forming the optical recording layer or at the side for forming the barrier layer is 1.0 GPa or greater;

[5] The sheet for a multilayer optical recording medium according to any one of [2] to [4], wherein the face of the process film at the side for forming the optical recording layer or at the side for forming the barrier layer comprises no fillers;

[6] The sheet for a multilayer optical recording medium according to any one of [2] to [5], wherein the process film comprises a substrate film and a coating film disposed on the substrate film, and the coating film has a thickness of 80 to 10,000 nm and is disposed on the face of the process film at the side for forming the optical recording layer or at the side for forming the barrier layer to suppress roughness of the substrate;

[7] The sheet for a multilayer optical recording medium according to any one of [2] to [6], wherein the face of the process film at the side for forming the optical recording layer or at the side for forming the barrier layer comprises a coating film comprising a polyester-based resin or a resin cured with an active energy ray;

[8] The sheet for a multilayer optical recording medium according to any one of [1] to [7], wherein the optical recording layer is a layer comprising a multiphoton absorbing material;

[9] A multilayer optical recording medium prepared by using the sheet according to any one of [1] to [8]; and

[10] A film for producing the sheet for a multilayer optical recording medium according to any one of [1] to [9], wherein an optical recording layer or a barrier layer is formed on a process film on a face at a side for forming the optical recording layer or at a side for forming the barrier layer, the face at the side for forming the optical recording layer or at the side for forming the barrier layer of the process film having a maximum height roughness (Rz) of 500 nm or smaller.

The Effect of the Invention

In accordance with the present invention, a sheet for producing a multilayer optical recording medium having a repeating structure in, which a plurality of optical recording layers are laminated with excellent precision and quality and a multilayer optical recording medium produced by using the sheet can be provided.

In the Figures, reference numerals mean as follows: 1, 1-1, 1-2, 1-(n−1), 1-n and 11: adhesive layers (pressure sensitive adhesive layers); 2: the first release film; 3: the second release film; 4, 4-1, 4-2, 4-(n−1) and 4-n: optical recording layers; 4a, 4a-1, 4a-2, 4a-(n−1) and 4a-n: optical recording layers; 5: a process film; 6, 6-1, 6-2, 6-(n−1) and 6-n: Unit A; 7, 7-1, 7-2, 7-(n−1) and 7-n: barrier layers; 8, 8-1, 8-2, 8-(n−1) and 8-n: Unit B; 9: a substrate plate; 10: a pressure sensitive adhesive layer having release films on both faces; 12: a transparent protective film; 20: an optical recording layer having a process film; 30: Unit A having a process film and a release film; 40: Sheet A; 50: a barrier layer having a process film; 60: a laminate; 70: Sheet B; and 80 and 90: multilayer optical recording layers.

THE MOST PREFERRED EMBODIMENT TO CARRYOUT THE INVENTION

The sheet for a multilayer optical recording medium of the present invention will be described in the following.

[Sheet for a Multilayer Optical Recording Medium]

The sheet for a multilayer optical recording medium (hereinafter, referred to simply as "the sheet", occasionally) is a sheet for a multilayer optical recording medium having a repeating structure comprising a plurality of laminated optical recording layers, which is characterized in that the sheet has a structure comprising a unit in which an optical recording layer and an adhesive layer are laminated or a structure in which an optical recording layer, a barrier layer and an adhesive layer are laminated in this order, wherein the maximum height of roughness (Rz) of the optical recording layer or the barrier layer is 500 nm or smaller.

(Optical Recording Layer)

In the sheet of the present invention, the material constituting the optical recording layer is not particularly limited, and a suitable material can be selected as desired from conventional materials known as the materials constituting optical recording layers in optical recording media. It is preferable that the material comprises a multiphoton absorbing material having an absorption at 200 to 800 nm. The multiphoton absorbing material means a compound having the property such that the compound absorbs at least two photons simultaneously and is converted into an excited state. From the standpoint of obtaining the practically sufficient recording density, materials comprising a material absorbing two photons which has a sectional area of two photon absorption of 0.1 GM or greater are preferable, and materials comprising a material absorbing two photons which has a sectional area of two photon absorption of 100 GM or greater are more preferable among the materials exhibiting the above property. The material described above may be, for example, a material constituted with the multiphoton absorbing material alone, a material constituted with the multiphoton absorbing material and other reactive compounds which are changed by the energy transfer from the excited multiphoton absorbing material or a material obtained by mixing the above compounds into a matrix. "GM" described above means $10^{-50}$ $cm^4 \cdot s \cdot molecule^{-1} \cdot photon^{-1}$.

Although the material constituting the matrix described above may be an inorganic material or an organic material, an organic macro-molecular material is preferable since production of the sheet of the present invention is facilitated and the material can be selected from variety of materials. The macromolecular material may be a homopolymer or a copolymer. The type of the monomer, the molecular weight and the form of polymerization are not particularly limited.

<Macromolecular Material>

Examples of the macromolecular material described above include various types of polyolefins such as various types of polyethylene, ethylene/1-butene copolymers, ethylene/4-methyl-1-pentene copolymers, ethylene/1-hexene copolymers, polypropylene, ethylene/propylene copolymers, propylene/1-butene copolymers, poly1-butene, 1-butene/4-methyl-1-pentene copolymers, poly4-methyl-1-pentene, poly3-methyl-1-butene, ethylene/cyclic olefin copolymers and cyclic olefin-based resins; ethylene/vinyl acetate copolymers; poly (meth)acrylates such as ethylene/acrylic acid copolymers, metal salts of ethylene/acrylic acid copolymers, polymethyl methacrylate and alicyclic acrylic resins; polyester-based resins such as polyethylene terephthalate and polyethylene naphthalate; fluororesins such as polyperfluoroethylene and perfluoroalkenyl vinyl ether polymers; polystyrenes; polyvinyl alcohol; polycarbonates; polyphenylene sulfide; polyether sulfone; polyimides; polyphenylene oxide; olefin/N-substituted maleimide copolymers; allyl carbonate resins; epoxy acrylate resins; and urethane acrylate resins. The macromolecular material may be used singly or in combination of two or more.

<Multiphoton Absorbing Material>

The multiphoton absorbing material may be a multiphoton absorbing material alone, a material comprising a multiphoton absorbing component chemically bonded to the matrix as a component of the main chain or side chains or a multiphoton absorbing material simply dispersed or dissolved in the matrix. The multiphoton absorbing material is not particularly limited, and various compounds can be used. Examples of the multiphoton absorbing material include compounds such as cyanine-based compounds, styryl-based compounds, pyrilium-based compounds, thiapyrilium-based compounds, melocyanine-based compounds, arylidene-based compounds, oxonol-based compounds, squalium-based compounds, azulenium-based compounds, coumarine-based compounds, pyran-based compounds, quinone-based compounds, anthraquinone-based compounds, triphenylmethane-based compounds, diphenylmethane-based compounds, xanthene-based compounds, thioxanthene-based compounds, phenothiazine-based compounds, azo-based compounds, azomethine-based compounds, fluorenone-based compounds, diarylethene-based compounds, spiropyran-based compounds, fulguide-based compounds, perylene-based compounds, polyene-based compounds, diphenylamine-based compounds, quinacridone-based compounds, azulenium-based compounds, porphyrin-based compounds, phthalocyanine-based compounds, styrene-based compounds, phenylenevinylene-based compounds, triphenylamine-based compounds and carbazole-based compounds.

In the present invention, the molecular weight of the multiphoton absorbing material is not particularly limited. From the standpoint of suppressing migration into the process film, it is preferable that the molecular weight is 300 or greater as the number-average molecular weight (Mn). The upper limit of the molecular weight is not particularly limited. The upper limit of the molecular weight is, in general, about 100,000 as the number-average molecular weight. As the multiphoton absorbing material, two-photon absorbing materials are preferable.

The macromolecular multiphoton absorbing material can be obtained by chemically bonding the multiphoton absorbing component to the matrix described above as a component of the main chain or the side chains The number-average molecular weight described above is the value obtained by the measurement by the gel permeation chromatography (GPC) and expressed as the value of the corresponding polystyrene.

Examples of the method of recording using the multiphoton absorbing material include a method in which modulation in the refractive index is read using a material isomerized with light such as compounds having azo group, C═C group or C═N group, a material polymerized with light such as (meth) acrylate compounds, a material having a structure reversibly changing with light such as organic photochromic materials or an organic refractive material forming charge distribution with light; a method in which fluorescent light is read using a material having the fluorescent property changing with light; and a method in which modulation of absorption or modulation of refractive index is read using a combination of a material generating an acid with light and a coloring agent developing color with an acid or a combination of an agent erasing color and a coloring agent which allows erasure of the color. In the above recording methods, the multiphoton absorbing compound itself may have the photoreactivity described above or the reaction may be induced by energy transfer from the multiphoton absorbing compound excited by multiphoton absorption to another reactive material.

<Properties of Optical Recording Layer>

In the sheet of the present invention, the thickness of the optical recording layer is not particularly limited. The thickness is, in general, about 0.04 to 50 μm and preferably 0.05 to 10 μm.

It is necessary that the maximum height roughness (Rz) of the optical recording layer is 500 nm or smaller. The maximum height roughness (Rz) is the surface roughness expressed by the maximum height (the difference between the highest portion and the lowest portion) in the sectional curve from which the reference length has been subtracted (described in Japanese Industrial Standard B 0601:2001). The value is varied greatly when a locally high portion or a locally low portion is present. Therefore, a great maximum height roughness (Rz) causes deterioration in the recording properties of the multilayer optical recording medium even when the average roughness of the surface of the optical recording layer or the barrier layer described below is small. When the maximum height roughness (Rz) of the optical recording layer and the barrier layer is kept at 500 nm or smaller, local scattering of light is suppressed, and the multilayer optical recording medium exhibiting the excellent recording properties can be obtained. When Rz exceeds 500 nm, a drawback arises in that scattering of light takes place in the obtained optical recording medium. It is preferable that Rz is 300 nm or smaller and more preferably 100 nm or smaller. The lower limit of Rz is not particularly limited. It is difficult that an optical recording layer having a value of Rz smaller than 0.1 nm is formed. Therefore, the lower limit of Rz is, in general, about 0.1 nm.

In the sheet of the present invention, the formation of the optical recording layer having the value of Rz described above can be conducted by transferring an optical recording layer formed on the face having a value of Rz of 500 nm or smaller of a process film at the side for forming the optical recording layer to the pressure sensitive adhesive layer as described later. The face of a process film at the side for forming the optical recording layer will be referred to as "the optical recording layer forming face" hereinafter.

The method of measurement of Rz described above will be described below.

(Adhesive Layer)

The adhesive constituting the adhesive layer in the sheet of the present invention is not particularly limited. Pressure sensitive adhesives exhibiting the pressure sensitive adhesive property at the ordinary temperature are preferable, and acrylic pressure sensitive adhesives are more preferable due to the excellent transparency.

As the acrylic pressure sensitive adhesive, for example, pressure sensitive adhesives comprising a (meth)acrylic acid ester-based copolymer and a crosslinking agent can be used.

<(Meth)Acrylic Acid Ester-Based Copolymer>

As the (meth)acrylic acid ester-based copolymer, copolymers of a (meth)acrylic acid ester in which the alkyl group in the ester portion has 1 to 20 carbon atoms with a monomer having a functional group having active hydrogen and other monomers which are used where desired are preferable.

Examples of the (meth)acrylic acid esters in which the alkyl group in the ester portion has 1 to 20 carbon atoms include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. The above (meth)acrylic acid ester may be used singly or in combination of two or more.

Examples of the monomer having a functional group having active hydrogen include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; monoalkylaminoalkyl (meth)acrylates such as monomethylaminoethyl (meth)acrylate, monoethylaminoethyl (meth)acrylate, monomethylaminopropyl (meth)acrylate and monoethylaminopropyl (meth)acrylate; and ethylenically unsaturated carboxylic acids such as acrylic acid, methacrylic acid, crotonic acid, maleic acid, itaconic acid and citraconic acid. The above monomer may be used singly or in combination of two or more.

Examples of the other monomer which is used where desired include vinyl esters such as vinyl acetate and vinyl propionate; olefins such as ethylene, propylene and isobutylene; halogenated olefins such as vinyl chloride and vinylidene chloride; styrene-based monomers such as styrene and x-methylstyrene; diene-based monomers such as butadiene, isoprene and chloroprene; nitrile-based monomers such as acrylonitrile and methacrylonitrile; and acrylamides such as acrylamide, N-methyl-acrylamide and N,N-dimethylacrylamide. The above monomer may be used singly or in combination of two or more.

The form of copolymerization of the (meth)acrylic acid ester-based copolymer is not particularly limited and may be any of a random copolymer, a block copolymer and a graft copolymer. It is preferable that the molecular weight is in the range of 300,000 to 2,000,000 as the weight-average molecular weight.

The weight-average molecular weight described above is the value obtained by the measurement by the gel permeation chromatography (GPC) and expressed as the value of the corresponding polystyrene.

In the present invention, the (meth)acrylic acid ester-based copolymer may be used singly or in combination of two or more.

<Crosslinking Agent>

The crosslinking agent in the acrylic pressure sensitive adhesive is not particularly limited, and a crosslinking agent can be suitably selected as desired from conventional crosslinking agents used for acrylic pressure sensitive adhesives. Examples of the crosslinking agent include polyisocyanate compounds, epoxy compounds, aziridine-based compounds, melamine resins, urea resins, dialdehydes, methylol polymers, metal chelate compounds, metal alkoxides and metal salts. Among these crosslinking agents, alicyclic polyisocyanate-based compounds, aliphatic polyisocyanate-based compounds, alicyclic epoxy-based compounds, aliphatic epoxy-based compounds, metal chelate compounds and aliphatic aziridine-based compounds are preferable since change in the transmittance of light due to change in the color (yellowing) of the layer of a pressure sensitive adhesive is suppressed, and degradation due to irradiation with laser is suppressed.

The metal chelate compound is not particularly limited, and a suitable compound can be selected from compounds conventionally used as the metal chelate compound in acrylic pressure sensitive adhesives. Examples of the metal chelate compound include chelate compounds in which the metal atom is aluminum, zirconium, titanium, zinc, iron or tin.

Examples of the alicyclic polyisocyanate-based compound and the aliphatic polyisocyanate-based compound include isophorone diisocyanate, bicycloheptane triisocyanate, cyclopentylene diisocyanate, cyclohexylene diisocyanate, methylcyclohexylene diisocyanate, hydrogenated diphenylmethane diisocyanate, hexamethylene diisocyanate, trimethylhexa-methylene diisocyanate, lysine diisocyanate, biuret compounds and isocyanurate compounds based on these polyisocyanates, and adducts as the reaction products with low molecular weight compounds having active hydrogen such as ethylene glycol, propylene glycol, neopentyl glycol, trimethylolpropane and castor oil.

Examples of the alicyclic epoxy-based compound and the aliphatic epoxy-based compound include 3,4-epoxycyclohexylmethyl 3,4-epoxy-cyclohexylcarboxylate, 1,3-bis(N, N-diglycidylaminomethyl)cyclohexane, hydrogenated bisphenol A diglycidyl ether, polyethylene glycol diglycidyl ether, polypropylene glycol diglycidyl ether, 1,6-hexanediol diglycidyl ether, adipic acid glycidyl ester and sebacic acid glycidyl ester.

Examples of the aluminum chelate compound include diisopropoxy-aluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, monoisopropoxyaluminum mono-N-lauroyl-p-alanate monolauryl acetoacetate, aluminum trisacetylacetonate, monoacetylacetonatoaluminum bis(isobutyl acetoacetate) chelate, monoacetylacetonatoaluminum bis(2-ethylhexyl acetoacetate) chelate, monoacetylacetonatoaluminum bis(dodecyl acetoacetate) chelate and monoacetylacetonatoaluminum bis (oleyl acetoacetate) chelate.

The aliphatic aziridine compound is not particularly limited, and a suitable compound can be selected as desired from compounds conventionally used as the aliphatic aziridine-based compound in acrylic pressure sensitive, adhesives. Examples of the aliphatic aziridine-based compound include trimethylolpropane tri(2-methyl-1-aziridinepropionate), tetramethylolmethane tri-β-aziidinylpropionate, 2,2'-bishydroxymethyl-butanol tris[3-(1-aziridinyl)propionate] and 1,6-hexamethylenediethylene-urea.

In the present invention, the alicyclic polyisocyanate-based compound, the aliphatic polyisocyanate-based compound, the alicyclic epoxy-based compound, the aliphatic epoxy-based compound, the metal chelate compound and the aziridine-based compound which are described above may be used singly or in combination of two or more. The content is selected, in general, in the range of 0.01 to 5.0 parts by mass, preferably in the range of 0.05 to 3.0 parts by mass and more preferably in the range of 0.1 to 1.0 part by mass based on 100 parts by mass of the (meth)acrylic acid ester-based copolymer described above from the standpoint of the properties as the pressure sensitive adhesive.

To the pressure sensitive adhesive, tackifiers, antioxidants, ultraviolet light absorbers, light stabilizers, softeners and fillers may be added where desired as long as the effect of the present invention is not adversely affected.

The thickness of the pressure sensitive adhesive layer in the sheet of the present invention is not particularly limited. The thickness is, in general, about 1 to 100 μm and preferably 2 to 30 μm.

The method of forming the adhesive layer will be described below.
(Barrier Layer)

The barrier layer in the sheet of the present invention is the layer disposed on the surface of the pressure sensitive adhesive layer described above where desired so that the optical recording layer is formed on the pressure sensitive adhesive layer using the material for forming the optical recording layer comprising a solvent by the spin coating process or the like exhibiting excellent productivity. When the optical recording layer is formed directly on the pressure sensitive adhesive layer by the spin coating process or the like without disposing the barrier layer, the pressure sensitive layer may be invaded with the solvent in the material for forming the optical recording layer or the material for forming the non-recording layer may be mixed into the pressure sensitive adhesive layer due to the poor resistance to solvent of the pressure resistive adhesive layer. Thus, the obtained multilayer optical recording medium exhibits poor precision and poor quality.

Examples of the material constituting the barrier layer include the various macromolecular materials described as the examples of the material constituting the matrix in the description of the optical recording layer. The material constituting the barrier layer may be used singly or in combination of two or more. Among the above materials, polyvinyl alcohol is preferable. Since polyvinyl alcohol is soluble in water and can be applied in the form of an aqueous solution and dried to form the barrier layer, polyvinyl alcohol is advantageous from the standpoint of the workability.
<Properties of Barrier Layer>

In the sheet of the present invention, the thickness of the barrier layer is not particularly limited. The thickness is, in general, about 0.01, to 100 μm and preferably 0.05 to 30 μm.

It is necessary that the maximum height roughness (Rz) of the barrier layer is 500 nm or smaller. When Rz exceeds 500 nm, the optical recording layer formed on the barrier layer by the spin coating process or the like has the same value of Rz, and a drawback arises in that scattering of light takes place in the obtained optical recording medium.

It is preferable that Rz is 300 nm or smaller and more preferably 100 nm or smaller. The lower limit of Rz is not particularly specified, and a smaller value is more preferable. However, it is difficult that a barrier layer having a value of Rz smaller than 0.1 nm is formed, and the lower limit of Rz is, in general, about 0.1 nm.

In the sheet of the present invention, the formation of the barrier layer having the value of Rz described above can be conducted by transferring a barrier layer formed on the face having a value of Rz of 500 nm or smaller of a process film at the side for forming the barrier layer to the pressure sensitive adhesive layer as described later. The face of a process film at the side for forming the barrier layer will be referred to as "the face for forming the barrier layer" hereinafter.

As the method of forming the optical recording layer on the barrier layer formed as described above, the process of applying the material for forming the optical recording layer by the spin coating process is preferable. By using the spin coating process, a coating fluid containing the multiphoton absorbing material alone without containing binders can be used as the material for forming the optical recording layer, and the optical recording layer exhibiting excellent recording sensitivity can be formed.

The method of measurement of Rz of the barrier layer will be described below.
(Preparation of the Sheet for a Multilayer Optical Recording Medium)

The sheet for a multilayer optical recording medium of the present invention includes two embodiments as described above, i.e., (1) the sheet comprising a unit (Unit A) in which an optical recording layer and an adhesive layer are laminated (hereinafter, referred to as Sheet A) and (2) the sheet comprising a unit (Unit B) in which an optical recording layer, a barrier layer and an adhesive layer are laminated in this order (hereinafter, referred to as Sheet B).
<Preparation of Sheet A>

As the process for preparing Sheet A in the present invention, for example, the process described in the following can be conducted.

Figure 1:
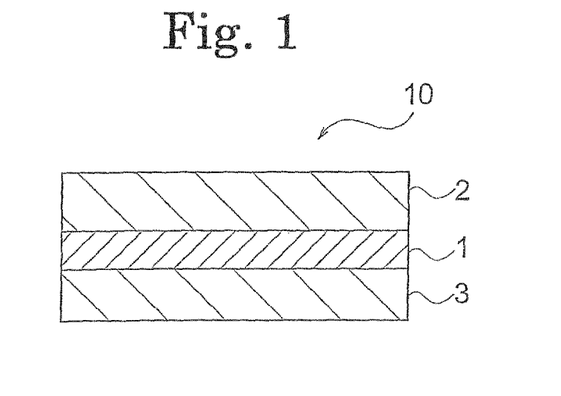
FIG. 1 shows a diagram exhibiting the structure of an example of a layer of a pressure sensitive adhesive having release films on both faces.

As the first step, a pressure sensitive adhesive layer having release films on both faces is prepared. FIG. 1 shows a diagram exhibiting the structure of an example of a layer of a pressure sensitive adhesive having release films on both faces. The pressure sensitive adhesive layer having release films on both faces 10 has a structure such that a pressure sensitive adhesive layer 1 is disposed between the first release film 2 and the second release film 3.

The pressure sensitive adhesive layer having release films on both faces 10 can be prepared, for example, by coating the face treated for releasing of the first release film 2 with the pressure sensitive adhesive described above by a conventional process such as the knife coating process, the roll coating process, the bar coating process, the blade coating process, the die coating process and gravure coating process in an amount such that a layer having a prescribed thickness is formed, followed by drying the formed coating layer and laminating the second release film 3 on the formed pressure sensitive adhesive layer 1.

As the release film described above, a release film conventionally used for a pressure sensitive adhesive layer may be used.

The release film described above is not particularly limited. Examples of the release film include films obtained by coating a polyolefin film such as a polyethylene film and a polypropylene film or a polyester film such as a polyethylene terephthalate film with a releasing agent such as a silicone resin to form a layer of a releasing agent. The thickness of the release film is, in general, about 20 to 150 µm although the thickness is not particularly limited.

Since it is preferable that the maximum height roughness (Rz) of the surface of the pressure sensitive adhesive layer is smaller, it is preferable that Rz of the face of the release film treated for releasing is 500 nm or smaller.

Figure 2:
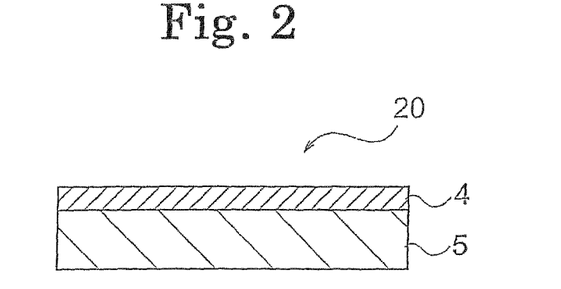
FIG. 2 shows a diagram exhibiting the structure of an example of the optical recording layer having a process film.

Separately, an optical recording layer having a process film is prepared as the film for producing the sheet for multilayer optical recording medium described below. FIG. 2 shows a diagram exhibiting the structure of an example of the optical recording layer having a process film. The optical recording layer having a process film 20 has a structure such that an optical recording layer 4 is disposed on a process film 5.

The optical recording layer having a process film 20 can be prepared, using a process film in which the maximum height roughness (Rz) of the face for forming the optical recording layer is 500 nm or smaller, by coating the face for forming the optical recording layer with a coating fluid comprising a material for forming the optical recording layer which comprises a multiphoton absorbing material, preferably a two-photon absorbing material, and a matrix material such as a macromolecular material in suitable relative amounts by a conventional process such as the knife coating process, the roll coating process, the bar coating process, the blade coating process, the die coating process and gravure coating process in an amount such that a layer having a prescribed thickness is formed, followed by drying the formed coating layer to form the optical recording layer 4.

The process film 5 will be described specifically below.

Figure 3:
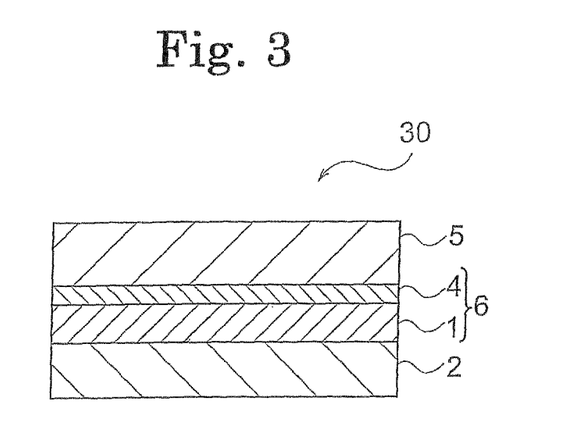
FIG. 3 shows a diagram exhibiting an example of Unit A in which a process film and a release film are laminated.

Using the pressure sensitive adhesive layer having release films on both faces 10 and the optical recording layer having a process film 20 prepared as described above, Unit A in which the optical recording layer and the pressure sensitive adhesive layer are laminated is prepared. FIG. 3 shows a diagram exhibiting an example of the unit having a laminate of an optical recording layer and a pressure sensitive adhesive layer and disposed between a process film and a release film (hereinafter, referred to as Unit A having a process film and a release film). Unit A having a process film and a release film 30 has a structure such that Unit A 6 in which the optical recording layer 4 and the pressure sensitive adhesive layer 1 are laminated has a process film 5 at the side of the optical recording layer 4 and the first release film 2 at the side of the pressure sensitive adhesive layer 1.

Unit A having a process film and a release film 30 having the structure described above can be prepared, for example, as described in the following.

The second release film 3 in the pressure sensitive adhesive layer having release films on both faces 10 prepared as described above is peeled. The face of the optical recording layer 4 in the optical recording layer having a process film 20 prepared as described above is laminated to the exposed pressure sensitive adhesive layer 1, and Sheet A comprising Unit A having a process film and a release film can be obtained as described above.

Figure 4:
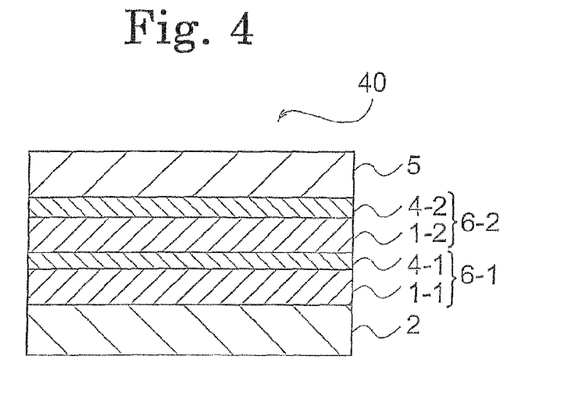
FIG. 4 shows a diagram exhibiting the structure of an example of Sheet A of the present invention having two layers of Unit A in which an optical recording layer and a pressure sensitive adhesive layer are laminated.

FIG. 4 shows a diagram exhibiting the structure of an example of Sheet A of the present invention having two layers of Unit A in which an optical recording layer and a pressure sensitive adhesive layer are laminated. Sheet A 40 of the present invention can be prepared as described in the following. However the process for preparing Sheet A is not limited to the process described in the following.

The process film 5 in Unit A 30 having a process film and a release film obtained as described above is peeled, and the face of the pressure sensitive adhesive layer 1-2 exposed by peeling the second release film 3 in the pressure sensitive adhesive layer having release films on both faces 10 is laminated to the face of the optical recording layer 4-1 exposed above. Then, the first release film 2 is peeled, and the face of the optical recording layer 4-2 of the optical recording layer having a process film 20 is laminated to the face of the pressure sensitive adhesive layer 1-2 exposed above, and Unit A 6-2 in which the optical recording layer 4-2 and the pressure sensitive adhesive layer 1-2 are laminated can be formed.

In this manner, Sheet A 40 of the present invention having two laminated layers of Unit A, i.e., Unit A 6-1 in which the optical recording layer 4-1 and the pressure sensitive adhesive layer 1-1 are laminated and Unit A 6-2 in which the optical recording layer 4-2 and the pressure sensitive adhesive layer 1-2 are laminated as shown in FIG. 4, can be prepared. A process film 5 is disposed on the optical recording layer 4-2, and the first release film 2 is disposed on the pressure sensitive adhesive layer 1-1.

The number of Unit A laminated in Sheet A of the present invention is, in general, about 1 to 6.

<Preparation of Sheet B>

As the process for preparing Sheet B of the present invention, for example, the process described in the following can be conducted.

As the first step, the pressure sensitive adhesive layer having release films on both faces shown in FIG. 1 is prepared by the process similar to the process for preparing Sheet A described above. Separately, a barrier layer having a process film is prepared as the film for producing the sheet for multilayer optical recording medium described below.

Figure 5:
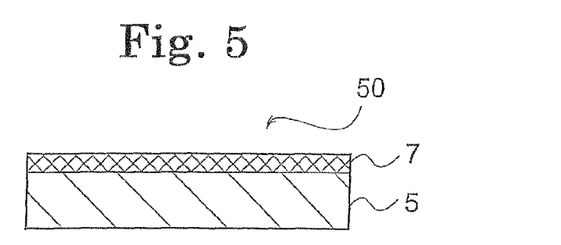
FIG. 5 shows a diagram exhibiting an example of the barrier layer having a process film.

FIG. 5 shows a diagram exhibiting an example of the barrier layer having a process film. The barrier layer having a process film 50 has a structure such that a barrier layer 7 is disposed on a process film 5.

The barrier layer having a process film 50 can be prepared, for example, using a process film 5 in which the face for forming the barrier layer has a maximum height roughness (Rz) of 500 nm or smaller, by coating the face for forming the barrier layer with a coating fluid comprising the material for forming the barrier layer by a conventional process such as the knife coating process, the roll coating process, the bar coating process, the blade coating process, the die coating process and the gravure coating process in an amount such that a layer having a prescribed thickness is formed, followed by drying the formed coating layer to form the barrier layer 7.

The process film 5 will be described specifically below.

Then, the second release film 3 in the pressure sensitive adhesive layer having release films on both faces 10 shown in FIG. 1 is peeled, and the face of the barrier layer 7 in the barrier layer having a process film 50 prepared as described above is laminated to the exposed pressure sensitive adhesive layer 1. After the process film 5 is peeled, the exposed barrier layer 7 is coated with a coating fluid comprising a multiphoton absorbing material, preferably a two-photon absorbing material, by a conventional process such as the spin coating process, the knife coating process, the roll coating process, the bar coating process, the blade coating process, the die coating process, the gravure coating process and the capillary coating process in an amount such that a layer having a prescribed thickness is formed, followed by drying the formed coating layer to form the optical recording layer. Thus, the laminate 60 having Sheet B disposed on the first release film 2 as shown in FIG. 6 can be obtained, wherein Sheet B comprises Unit B 8 in which the optical recording layer 4a, the barrier layer 7 and the pressure sensitive adhesive layer 1 are laminated in this order.

When the optical recording layer is formed directly on the barrier layer by the spin coating process or the like as described above, it is made possible that the coating fluid comprising the multiphoton absorbing material alone is used without using a matrix material such as a macromolecular material, and the optical recording layer exhibiting excellent recording sensitivity can be formed.

Figure 7:
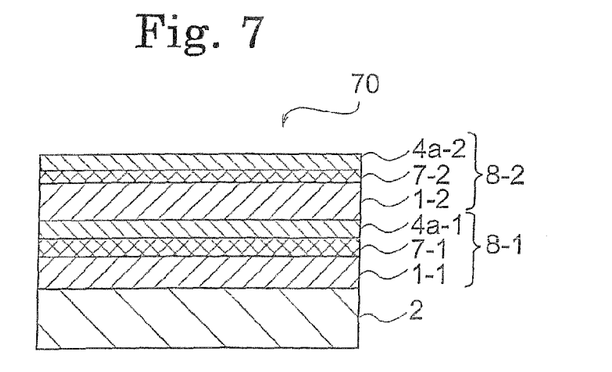
FIG. 7 shows a diagram exhibiting the structure of an example of Sheet B of the present invention.

FIG. 7 shows a diagram exhibiting the structure of an example of Sheet B of the present invention. Sheet B 70 of the present invention has a structure such that two layers of Unit B, i.e., Unit B 8-1 in which an optical recording layer 4a-1, a barrier layer 7-1 and a pressure sensitive adhesive layer 1-1 are laminated in this order and Unit B 8-2 in which an optical recording layer 4a-2, a barrier layer 7-2 and a pressure sensitive adhesive layer 1-2 are laminated in this order, are disposed on the first release film 2.

Figure 6:
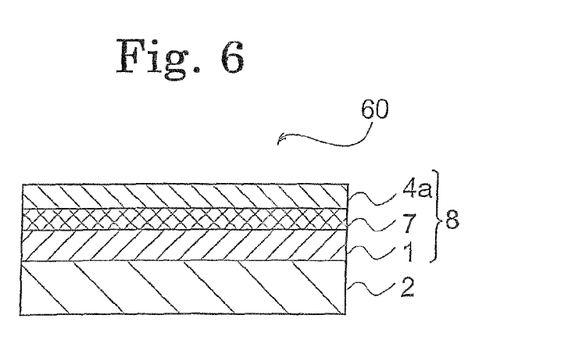
FIG. 6 shows a diagram exhibiting an example of the laminate for producing Sheet B of the present invention.

Sheet B 70 can be prepared, for example, by preparing two sheets of the laminate 60 shown in FIG. 6, followed by laminating the face of the pressure sensitive adhesive layer 1 exposed by peeling the first release film 2 in the second laminate to the face of the first laminate 4a. However, the process for preparing Sheet B 70 is not limited to the process described above.

The number of Unit B described above laminated in Sheet B of the present invention is, in general, about 1 to 6.
(Process Film)<
Properties of the Process Film>

The process film is a film having a structure comprising a substrate film and a coating film disposed on the surface of the substrate, where desired.

The formation of the optical recording layer in Sheet A comprising Unit A in which the optical recording layer and the pressure sensitive adhesive layer are laminated and the formation of the barrier layer in Sheet B comprising Unit B in which the optical recording layer, the barrier layer and the pressure sensitive adhesive layer are laminated in this order can be achieved by transferring the optical recording layer and the barrier layer, respectively, formed on the process film to the pressure sensitive adhesive layer, In the present invention, it is necessary that the maximum height roughness (Rz) of each of the optical recording layer and the barrier layer described above is 500 nm or smaller, preferably 300 nm or smaller and more preferably 0.01 to 100 nm based on the reason described above. Therefore, for forming the optical recording layer and the barrier layer having Rz described above, it is essential that the maximum height roughness (Rz) of the face for forming the optical recording layer and the face for forming the barrier layer, respectively, in the process film described above to be 500 nm or smaller, preferably 300 nm or smaller and more preferably 0.01 to 100 nm similarly to the condition described above.

When the coating film of the face for forming the optical recording layer in the process film is soft, low molecular weight components in the optical recording layer migrate into the coating film when the optical recording layer is formed on the surface film. This causes problems in that the properties for recording change and that separation of the optical recording layer from the process film becomes difficult.

Therefore, in the present invention, it is preferable that the surface film Young's modulus of the process film on the face for forming the optical recording layer or the face for forming the barrier layer is 1.0 GPa or greater and more preferably 1.5 to 15 GPa.

The methods of the measurement of the maximum height roughness (Rz) and the surface film Young's modulus of the face for forming the optical recording layer and the face for forming the barrier layer in the process film will be described below.
(Preparation of the Process Film)

The process film exhibits the releasing property so that the optical recording layer and the barrier layer formed on the film can be separated. Although the face for forming the optical recording layer and the face for forming the barrier layer of the substrate film may be treated for releasing or may have a coating film for suppressing roughness of the substrate film or a coating film for adjusting the surface film Young's modulus, it is essential that Rz be in the range described above.

As the releasing treatment, for example, the substrate film can be coated with a conventional releasing agent such as a silicone-based releasing agent, a butadiene-based releasing agent and a fluorine-based releasing agent. The thickness of the layer of the releasing agent is not particularly limited and can be set as desired. The thickness is, in general, 0.05 to 50 μm.

It is preferable that the peeling strength of the process film, is 10 to 700 mN/25 mm. When the peeling strength is in this range, workability of transfer of the optical recording layer or the barrier layer formed on the process film is excellent. It is more preferable that the peeling strength is 30 to 300 mN/25 mm.

For the process film, it is preferable that the face for forming the optical recording layer or the face for forming the barrier layer comprises no fillers. It is preferable that the roughness of the substrate is suppressed by forming a coating film having a thickness of about 10 to 10,000 nm, more preferably 50 to 8,000 nm and most preferably 80 to 5,000 nm. Suppressing the roughness means decreasing the value of the surface roughness by forming a coating film. As the index for the surface roughness, Rz described above can be used.

The coating film for suppressing the roughness is not particularly limited and may be any of inorganic coating films and organic coating films as long as the optical recording layer or the barrier layer formed on the coating film can be peeled. Coating films of polyester-based resins such as alkyd resins and coating films of resins cured with an active energy ray are preferable. The coating films of polyester-based resins and the coating films of resins cured with an active energy ray do not cause repelling of the coating fluid comprising the material for forming the optical recording layer or the barrier layer of the present invention since these films have a suitable surface tension, and the optical recording layer or the barrier layer having a small maximum height roughness (Rz) can be easily formed. The formed optical recording layer or the barrier layer can be easily peeled. When repelling of the coating fluid takes place, the repelled portion forms a defect and the value of the maximum height roughness (Rz) is increased or, occasionally, the optical recording layer or the barrier layer itself cannot be formed. In addition, transfer of low molecular weight components such as multiphoton absorbing material to those coating films described above is small.

(a) Substrate Film

Examples of the substrate film in the process film include polyester films such as polyethylene terephthalate films, polybutylene terephthalate films and polyethylene naphthalate films; polyethylene films; polypropylene films; polyvinyl chloride films; polyvinylidene chloride films; polyvinyl alcohol films; ethylene-vinyl acetate copolymer films; polystyrene films; polycarbonate films; polymethylpentene films; polysulfone films; polyether ether ketone films; polyether sulfone films; polyphenylene sulfide films; polyether imide films; polyimide films; fluororesin films; polyamide films; acrylic resin films; norbornene-based resin films; and cycloolefin resin films.

The thickness of the substrate film is not particularly limited. The thickness is, in general, about 1 to 500 μm and preferably 2 to 200 μm.

Where necessary, the face for forming the coating film of the substrate film may be subjected, for example, to the treatment by corona discharge, the treatment by plasma discharge, the treatment with chromic acid (a wet process), the treatment with flames, the treatment with the heated air or the treatment with ozone and irradiation with ultraviolet light so that adhesion with the coating film formed on the substrate film is enhanced.

(b) Formation of a Coating Film of a Polyester-Based Resin

As the coating film of the polyester-based resin, coating films of alkyd resins having a crosslinked structure are preferable. As the process for forming the film, for example, the process comprising curing a layer comprising a heat curable resin composition comprising (X) an alkyd resin, (Y) a crosslinking agent and, where desired, (Z) a curing catalyst by heating can be conducted.

The alkyd resin of Component (X) is not particularly limited, and a resin can be suitably selected from resins conventionally known as the alkyd resins. The alkyd resin is a resin obtained by condensation of a polyhydric alcohol and a polybasic acid and includes nonconvertible alkyd resins which are condensates of dibasic acids and dihydric alcohols or modification products with non drying oils and convertible alkyd resins which are condensates of dibasic acids and alcohols having a functionality of three or greater. Any of these alkyd resins can be used in the present invention.

Examples of the crosslinking agent of Component (Y) include amino resins such as melamine resins and urea resins, urethane resins, epoxy resins and phenol resins.

In the present invention, the crosslinking agent of Component (Y) may be used singly or in combination of two or more.

It is preferable that the relative amounts of Component (X) to Component (Y) in the heat curable resin composition is in the range of 70:30 to 10:90 as the ratio of the amounts by mass of solid components. When the relative amount of Component (X) is more than the above range, the sufficiently crosslinked structure cannot be obtained in the cured product. Moreover, it is difficult that the desired Young's modulus is obtained, and the releasing property is decreased. When the relative amount of Component (X) is less than the above range, the Young's modulus of the cured product is excessively great, and the cured product is hard and fragile to deteriorate the releasing property. It is preferable that the relative amounts of Component (X) to Component (Y) is in the range of 65:35 to 10:90 and more preferably in the range of 60:40 to 20:80 as the ratio of the amounts by mass of solid components.

In the heat curable resin composition, an acidic catalyst can be used as the curing catalyst of Component (Z). The acidic catalyst is not particularly limited, and an acidic catalyst can be suitably selected from acidic catalysts conventionally known as the catalysts for crosslinking reaction of alkyd resins As the acidic catalyst, for example, organic acidic catalysts such as p-toluenesulfonic acid and methanesulfonic acid are preferable. The acidic catalyst may be used singly or in combination of two or more. The amount is selected, in general, in the range of 0.1 to 40 parts by mass, preferably in the range of 0.5 to 30 parts by mass and more preferably in the range of 1 to 20 parts by mass based on 100 parts by mass of the sum of the amounts of Component (X) and Component (Y) described above.

The heat curable resin composition is used, in general, in the form of a solution in an organic solvent due to convenience in the use. As the solvent used in the above, a solvent can be suitably selected from conventional solvents which exhibit solubility on Component (X) and Component (Y) and are inert to these components. Examples of the solvent include toluene, xylene, methanol, ethanol, isobutanol, n-butanol, acetone, methyl ethyl ketone and tetrahydrofuran. The solvent may be used singly or in combination of two or more.

The heat curable resin composition can be obtained by dissolving Component (X), Component (Y), Component (Z) which is used where desired and various additive components into the organic solvent in each specific amount, followed by adjusting the viscosity to a value suitable for the coating operation. The additive components used in the above are not particularly limited and can be suitably selected from additive components conventionally known as the additive components for alkyd resins. Examples of the additive components include antistatic agents such as cationic surfactants, acrylic resins and other resins for adjusting flexibility and viscosity, leveling agents and defoaming agents.

The coating film of the resin can be formed by coating one face of the substrate film with the heat curable resin composition obtained as described above by a conventional process such as the bar coating process, the reverse roll coating process, the knife coating process, the roll knife coating process, the gravure coating process, the air doctor coating process, the doctor blade coating process and the capillary coating process, followed by curing the formed coated film at a temperature of about 80 to 150° C. for about several seconds to several minutes.

The thickness of the coating film of the resin formed as described above is, in general, 10 to 10,000 nm and preferably 50 to 8,000 nm as described above.

(c) Formation of Coating Film of a Cured Resin Using an Active Energy Ray

When the coating film of the resin described above is a coating film comprising a cured product of a resin composition of the active energy ray curable type, a monomer and/or an oligomer polymerizable with an active energy ray which has two or more polymerizable unsaturated groups in the molecule can be used as the compound of the active energy ray curable type.

The compound of the active energy ray curable type means a polymerizable compound which can be crosslinked and cured by irradiation with a ray having energy quantum among electromagnetic waves and charged particles, i.e., ultraviolet light, electron beams and the like.

When the active energy ray is an active ray such as ultraviolet light, in general, a photopolymerization initiator is used in combination with the monomer and/or the oligomer of the active energy ray curable type. When the active energy ray is electron beams, no photopolymerization initiator is necessary. In the present invention, it is preferable that an active ray such as ultraviolet light is used as the active energy ray. Therefore, it is preferable that the resin composition of the active energy ray curable type is a resin composition of the photocurable type which comprises (A) a monomer and/or an oligomer of the active energy ray curable type having two or more polymerizable unsaturated groups in the molecule and (B) a photopolymerization initiator.

Examples of the monomer of the active energy ray curable type having two or more polymerizable unsaturated groups in the molecule used as Component (A) in the resin composition of the photocurable type include at least one monomer selected from (meth)acrylate compounds having a functionality of two or greater.

Examples of the (meth)acrylate compound having a functionality of two or greater include 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, dicyclopentenyl di(meth)acrylate modified with caprolactone, phosphoric acid di(meth)acrylate modified with ethylene oxide, cyclohexyl di(meth)acrylate modified with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate and dipentaerythritol hexa(meth)acrylate modified with caprolactone. The (meth)acrylate compound may be used singly or in combination of two or more.

Examples of the polymerizable oligomer of the active energy ray curable type include polyester acrylate-based polymerizable oligomers, epoxy acrylate-based polymerizable oligomers, urethane acrylate-based polymerizable oligomers and polyol acrylate-based polymerizable oligomers. The polymerizable oligomers of the active energy ray curable type may be used singly or in combination of two or more and may be used in combination with the (meth)acrylate compounds described above.

As the photopolymerization initiator of Component (B), at least one photopolymerization initiator can be selected as desired from conventional photopolymerization initiators conventionally used as the photopolymerization initiator for acrylate-based compounds. Examples of the photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl-2-(hydroxy-2-propyl)ketone, benzophenone, p-phenylbenzophenone, 4,4'-diethylaminobenzophenone, dichlorobenzo-phenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylamine benzoic acid ester. The amount of the photopolymerization initiator is selected, in general, in the range of 0.2 to 10 parts by mass based on 100 parts by mass of the photopolymerizable monomer and/or the photopolymerizable oligomer.

The resin composition of the active energy ray curable type, preferably the resin composition of the photocurable type, used in the present invention can be prepared by dissolving or dispersing the compound of the active energy ray curable type and the photopolymerization initiator which are described above and various additive components used where desired such as monofunctional active energy ray curable monomers, antioxidants, ultraviolet light absorbers, light stabilizers, leveling agents and defoaming agents in each specific amount into a suitable solvent.

Examples of the solvent used in the above include aliphatic hydrocarbons such as hexane and heptane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone, isophorone and cyclohexanone; esters such as ethyl acetate and butyl acetate; and cellosolve-based solvents such as ethylcellosolve.

The concentration and the viscosity of the composition prepared as described above are not particularly limited as long as the coating operation can be conducted and can be suitably selected by the situation.

The coating film of the resin can be formed by coating one face of the substrate film with the above composition by a conventional process such as the bar coating process, the knife coating process, the roll coating process, the blade coating process, the die coating process and the gravure coating process to form a coated film, followed by drying by heating where desired and, then, curing the obtained coated film by irradiation with an active energy ray.

As the active energy ray, for example, an active ray such as ultraviolet light is preferable. The ultraviolet light can be obtained from a high pressure mercury lamp, H BULB manufactured by FUSION UV SYSTEMS JAPAN K. K. or a xenon lamp. The amount of irradiation is, in general, 100 to 50 mJ/cm$^2$.

The thickness of the coating film of the resin obtained as described above is, in general, 10 to 10,000 nm and preferably 50 to 8,000 nm as described above.

The coating film for adjusting the surface film Young's modulus may be an organic film or an inorganic film. For the organic film, the resin compositions described above for the resin composition of the active energy ray curable type are preferable. Examples of the inorganic film include films of metal oxide exhibiting transparency such as indium oxide doped with tin formed on the substrate film by the sputtering process or the ion plating process. The thickness of the inorganic film is, in general, about 10 to 1,000 nm.

In the process film prepared as described above, the maximum height roughness (Rz) of the face for forming the optical recording layer or the barrier layer can be adjusted to 500 nm or smaller and the surface film Young's modulus can be adjusted to 1.0 GPa or greater. In the present invention, migration of low molecular weight components in the optical recording layer into the coating film of resin of the process film can be suppressed by adjusting the surface film Young's modulus at 1.0 GPa or greater when the optical recording layer is formed on the face for forming the optical recording layer or the face for forming the barrier layer of the process film, and the optical recording layer having Rz of 500 nm or smaller can be formed by transferring the optical recording layer to the pressure sensitive adhesive layer in Sheet A.

The barrier layer having Rz of 500 nm or smaller can be formed by forming the barrier layer on the face for forming the barrier layer of the process film and transferring the formed barrier layer to the pressure sensitive adhesive layer of Sheet B. The optical recording layer can be formed with excellent productivity by coating the barrier layer with the material for forming the optical recording layer by the spin coating process, followed by drying the formed coating film. In this case, the coating fluid comprising the multiphoton absorbing material alone can be used as the material for forming the optical recording layer since the spin coating process is conducted, and the optical recording layer exhibiting excellent recording sensitivity can be formed.

The present invention further provides a film for producing the sheet for a multilayer optical recording medium of the present invention which is characterized in that an optical recording layer or a barrier layer is formed on a process film on the face at the side for forming the optical recording layer or at the side for forming the barrier layer, wherein the process film has a maximum height roughness (Rz) of 500 nm or smaller on the face at the side for forming the optical recording layer or at the side for forming the barrier layer. The process film, the optical recording layer, the barrier layer and the process for forming the optical recording layer and the barrier layer are the same as those for the sheet for a multilayer recording medium described above.

The multilayer optical recording medium of the present invention will be described in the following.

[Multilayer Optical Recording Medium]

The multilayer optical recording medium of the present invention is characterized in that the medium is prepared by using the sheet for a multilayer optical recording medium of the present invention, i.e., Sheet A comprising Unit A in which an optical recording layer and a pressure sensitive adhesive layer are laminated or Sheet B comprising Unit B in which an optical recording layer, a barrier layer and a pressure sensitive adhesive layer are laminated.

The number of the unit (Unit A or Unit B) in the multilayer optical recording medium of the present invention is not particularly limited and is, in general, about 2 to 200 and preferably 3 to 100. When a single unit is used, the sufficient recording density is not obtained. When the number of the unit exceeds 200, there is the possibility that problems arise for writing and reading information due to absorption of light at the layers and reflection of light at the interfaces of layers.

Figure 8:
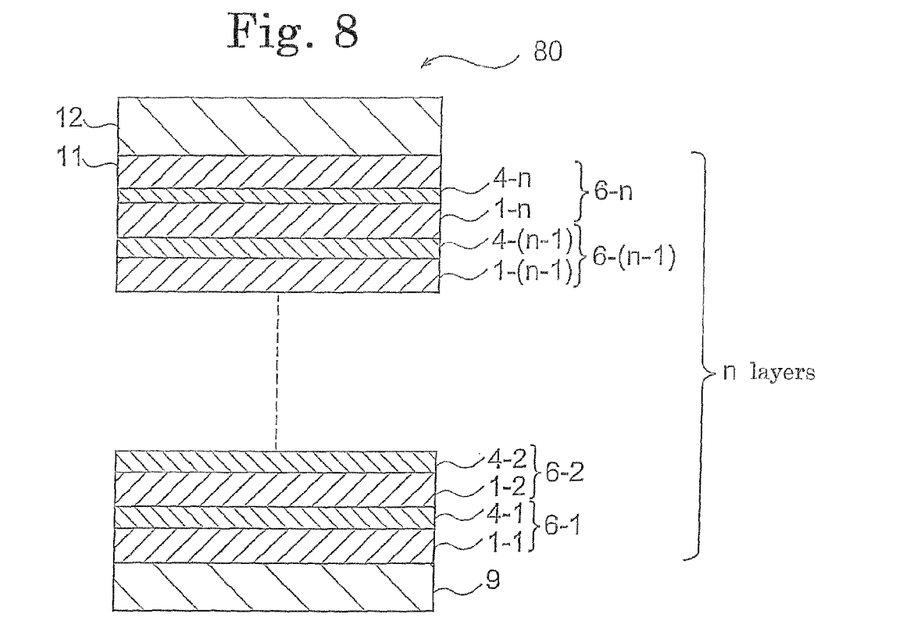
FIG. 8 shows a diagram exhibiting a sectional view of an example of the structure of the multilayer optical recording medium of the present invention.

FIG. 8 shows a diagram exhibiting a sectional view of an example of the structure of the multilayer optical recording medium of the present invention. The multilayer optical recording medium 80 has a structure having many adhesive layers and optical recording layers laminated alternately on a substrate plate 9 in a manner such that an adhesive layer 1-1, an optical recording layer 4-1, an adhesive layer 1-2, an optical recording layer 4-2 . . . an adhesive layer 1-($n-1$), optical recording layer 4-($n-1$), an adhesive layer 1-$n$ and an optical recording layer 4-$n$ are disposed, and a protective film 12 is disposed at the uppermost layer via an adhesive layer 11, where necessary. As the substrate plate 9, a glass plate or a film of polycarbonate, polymethyl methacrylate or a cycloolefin resin can be used. As the protective film 12, a film of a transparent resin such as polycarbonate, polymethyl methacrylate or a cycloolefin resin can be used. For the adhesive layer 11, the pressure sensitive adhesive described above can be used. The marks 6-1, 6-2, 6-($n-1$) and 6-$n$ means the first, the second, the (n-1)th and n-th Unit A, respectively. The multilayer optical recording medium 80 having the structure described above can be produced, for example, as described in the following using Sheet A 40 for a multilayer optical recording layer shown in FIG. 4.

The first release film 2 is peeled from Sheet A 40, and the pressure sensitive adhesive layer 1-1 is exposed. The substrate plate 9 and Sheet A are laminated in a manner such that the exposed pressure sensitive adhesive layer 1-1 and the substrate plate 9 face each other. The process film 5 is peeled from the resultant laminate, and the optical recording layer 4-2 is exposed. The first release film 2 is peeled from another Sheet A for a multilayer optical recording medium 40 to expose a pressure sensitive adhesive layer 1-1. The laminate obtained above and the other Sheet A 40 are laminated in a manner such that the optical recording layer 4-2 and the pressure sensitive adhesive layer 1-1 exposed above (forming 1-3 in FIG. 8, not shown in the figure) face each other. A multilayer laminating structure in which n layers each of the optical recording layer and the pressure sensitive adhesive layer are laminated can be obtained by repeating the lamination by the same procedures. The multilayer optical recording medium 80 can be obtained by attaching the protective film 12 having an adhesive layer 11 at the uppermost layer of the multilayer laminate structure.

Figure 9:
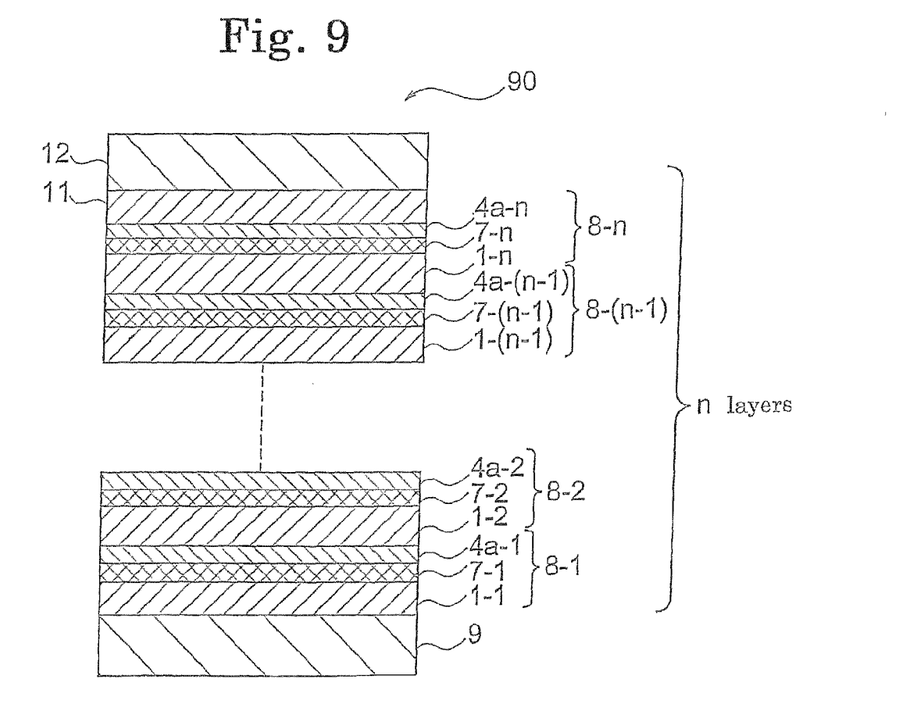
FIG. 9 shows a diagram exhibiting a sectional view of another example of the structure of the multilayer optical recording medium of the present invention.

FIG. 9 shows a diagram exhibiting a sectional view of another example of the structure of the multilayer optical recording medium of the present invention. The multilayer optical recording medium 90 has a structure having many Unit B, in which a pressure sensitive adhesive layer, a barrier layer and an optical recording layer are laminated in this order, laminated on a substrate plate 9 in a manner such that a pressure sensitive adhesive layer 1-1, a barrier layer 7-1, an optical recording layer 4$a$-1, a pressure sensitive adhesive layer 1-2, a barrier layer 7-2, an optical recording layer 4$a$-2 . . . a pressure sensitive adhesive layer 1-($n-1$), a barrier layer 7-($n-1$), an optical recording layer 4-($n-1$), a pressure sensitive adhesive layer 1-$n$, a barrier layer 7-$n$ and an optical recording layer 4-$n$ are disposed, and a protective film 12 is disposed at the uppermost layer via an adhesive layer 11, where necessary. For the substrate plate 9, the protective film 12 and the adhesive layer 11, the same films and layers as those described above can be used. The marks 8-1, 8-2, 8-($n-1$) and 8-$n$ means the first, the second, the (n-1)th and n-th Unit B, respectively.

The multilayer optical recording medium 90 having the structure described above can be produced, for example, as described in the following using Sheet B 70 for a multilayer optical recording layer shown in FIG. 7.

The first release film 2 is peeled from Sheet B 70, and the pressure sensitive adhesive layer 1-1 is exposed. The substrate plate 9 and Sheet B are laminated in a manner such that the exposed pressure sensitive adhesive layer 1-1 and the substrate plate 9 face each other. The first release film 2 is peeled from another Sheet B for a multilayer optical recording medium 70 to expose a pressure sensitive adhesive layer 1-1. The laminate obtained above and the other Sheet B 70 are laminated in a manner such that the optical recording layer 4$a$-2 of the above laminate and the pressure sensitive adhesive layer 1-1 exposed above (forming 1-3 in FIG. 8, not shown in the figure) face each other. A multilayer laminating structure in which n layers each of the optical recording layer, the barrier layer and the pressure sensitive adhesive layer are laminated can be obtained by repeating the lamination by the same procedures. The multilayer optical recording medium 90 shown in FIG. 9 can be obtained by attaching the protective film 12 having an adhesive layer 11 to the optical recording layer 4$a$-$n$ at the uppermost layer of the multilayer structure.

The multilayer optical recording medium of the present invention obtained as described above may further comprise reflection layers, layers of dielectric substances, protective layers and layers having recording pits and groove patterns in combination with the optical recording layer, the adhesive layer and the barrier layer, where necessary.

EXAMPLES

The present invention will be described more specifically with reference to examples in the following. However, the present invention is not limited to the examples.

Properties in Examples and Comparative Examples were obtained by the following methods.

(1) Measurement of the Maximum Height Roughness (Rz)

A laminate film having the structure shown in FIG. 3 in which a process film, an optical recording layer (the thickness: 0.6 μm) or a barrier layer (the thickness: 1.0 μm), a pressure sensitive adhesive layer (the thickness: 10 μm) and a release film were laminated in this order was prepared. The maximum height roughness (Rz) of the face for forming the optical recording layer or the face for forming the barrier layer of the process film used for the laminate film was measured. The process film in the laminate film was peeled, and Rz of the exposed optical recording layer or barrier layer (Example 7) was also measured.

Rz was measured using a surface roughness meter [manufactured by MITUTOYO Corporation; the name of the instrument: "SV-3,000"]

(2) Measurement of the surface film Young's modulus of a process film

The surface film Young's modulus of each process film on the face for forming the optical recording layer or the face for forming the barrier layer was measured using a nanoindenter [manufactured by MTS Company; the name of the instrument: "NANOINDENTER TEST WORKS-4"] which was an instrument for measuring mechanical properties of a thin film. The value at the position of 50 nm in the direction of the thickness was used.

(3) Measurement of the Haze Value

A laminate film having the same structure as that described above in (1) was prepared. The release film was Peeled, and the laminate film was attached to a slide glass as the support in a manner such that the exposed pressure sensitive adhesive layer faced the slide glass. Then, after the process film was peeled, incident light was applied at the side of the optical recording layer or the barrier layer, and the haze value was measured using a haze meter [manufactured by NIPPON DENSHOKU INDUSTRIES Co., Ltd.; the name of the instrument: "NDH2000"]. When the haze value was 2.5% or smaller, the sample was regarded to have passed the test.

(4) Measurement of the Number of Bright Spots

A laminate film having the same structure as that described above in (1) was prepared. The release film was peeled, and the laminate film was attached to a slide glass as the support in a manner such that the exposed pressure sensitive adhesive layer faced the slide glass. After the process film was peeled, the face at the side of the optical recording layer or the barrier layer was observed by a digital microscope [manufactured by KEYENS Corporation; the name of the instrument: "VHX-200"] at a magnification of 1,000. The number of bright spots in the area of 100 μm×100 μm was counted. The bright spot is derived from roughness of the optical recording layer or the barrier layer. When the number of bright spots was $50/10^4$ $\mu m^2$, the sample was regarded to have passed the test.

(5) Migration of low molecular weight components into a process film (the fraction of residual components)

In Examples 1 to 6 and Comparative Example 1, a laminate film having the same structure as that described above in (1) was prepared. The release film was peeled, and the laminate film was attached to a slide glass as the support in a manner such that the exposed pressure sensitive adhesive layer faced the slide glass. After the process film was peeled, the absorption of light with the peeled process film was measured, and a-value(%) was obtained by the following equation:

$a=\{$[absorption with process film after peeling the recording layer (absorption $\lambda_{max}$)]/[absorption with process film having recording layer (absorption $\lambda_{max}$)]$\}\times100$ When the a-value was 10% or smaller, migration of low molecular weight components derived from the optical recording layer to the process film was absent and, when the a-value exceeded 10%, migration of low molecular weight components to the process film was present. The measurement was conducted at a wavelength of 200 to 800 nm.

(6) Measurement of Peeling Force

A laminate film having the same structure as that described above in (1) was prepared. After the release film was peeled, the laminate film was attached to a glass substrate in a manner such that the exposed pressure sensitive adhesive layer faced the glass substrate. Then, the 180° peeling test of the process film was conducted at 25° C. by the method of Japanese Industrial Standard Z 0327, and the peeling force was measured.

(7) Measurement of Contact Angle

The contact angle of a liquid droplet on the face of a process film was measured by the liquid droplet method using a contact angle meter [manufactured by KYOWA INTERFACE SCIENCE Co., Ltd.; the type "CA-D"]. A droplet of purified water (the diameter: 2 mm) was used as the liquid droplet.

(8) Observation of Repelling of a Coating Fluid

The presence or the absence of repelling of a coating fluid was visually observed immediately after a coating fluid for an optical recording layer was applied to the process film in Examples 1 to 6 and Comparative Examples 1 and 2 and immediately after a coating fluid for forming a barrier layer was applied to the process film in Example 7.

Preparation Example 1

Preparation of Coating Fluid (a) for Forming an Optical Recording Layer

A diarylethene [manufactured by TOKYO CHEMICAL INDUSTRY Co., Ltd.; the number-average molecular weight: 326] as the two-photon absorbing material and polymethyl methacrylate [manufactured by SIGMA-ALDRICH JAPAN Company; the weight-average molecular weight: 350,000] as the matrix material were mixed in amounts such that the ratio of the amounts by mass was 1:9. Methyl ethyl ketone as the solvent was added, and Coating fluid (a) for forming an optical recording layer having a concentration of solid components of 5% by mass was prepared.

Preparation Example 2

Preparation of Coating Fluid (b) for Forming a Barrier Layer

Polyvinyl alcohol [manufactured by THE NIPPON SYNTHETIC CHEMICAL INDUSTRY Co., Ltd.; the trade name: "GOSENOL EG-05"] was dissolved, into purified water as the solvent, and Coating fluid (b) for forming a barrier layer having a concentration of solid components of 5% by mass was prepared.

Preparation Example 3

Preparation of a Pressure Sensitive Adhesive Sheet (1) Preparation of Coating Fluid (c) of a Pressure Sensitive Adhesive To 100 parts by mass of an ethyl acetate solution (the concentration of solid components; 30% by mass) of an acrylic acid ester copolymer (the weight-average molecular weight: 500,000) obtained by using 96 parts by mass of n-butyl acrylate and 4 parts by mass of acrylic acid, 8 parts by mass of an aluminum chelate-based crosslinking agent [manufactured by SOKEN CHEMICAL AND ENGINEERING Co., Ltd.; the trade name: "M-5A"; the concentration of solid components: 5% by mass] was added. The resultant mixture was stirred until a uniform solution was obtained, and Coating fluid (c) of a pressure sensitive adhesive was prepared.

(2) Preparation of the First Release Film

The smooth face (Rz: 80 nm) of a polyethylene terephthalate film having a thickness of 50 μm [manufactured by TOYOBO Co., Ltd.; the trade name: "A41001"] was coated, using a Mayer bar #4, with a coating fluid which was obtained by adding 1.5 part by mass of a catalyst [manufactured by SHIN-ETSU CHEMICAL Co., Ltd.; the trade name: "CAT-PL-50T"] to 100 parts by mass of a silicone resin [manufactured by SHIN-ETSU KAGAKU Co., Ltd.; the trade name: "KS-847H"], followed by adding toluene to dilute the fluid so that the concentration of solid components was 1.3% by mass. The formed, coating film was dried at 150° C. for 1 minute to form a silicone release layer having a thickness of 100 nm, and the first release film was prepared.

(3) Preparation of the Second Release Film

The smooth face (Rz: 80 nm) of a polyethylene terephthalate film having a thickness of 50 μm [manufactured by TOYOBO Co., Ltd.; the trade name: "A41001"] was coated, using a Mayer bar #4, with a coating fluid which was obtained by adding 1.0 part by mass of a catalyst [manufactured by SHIN-ETSU CHEMICAL Co., Ltd.; the trade name: "CAT-PL-50T"] to 100 parts by mass of a silicone resin [manufactured by SHIN-ETSU CHEMICAL Co., Ltd.; the trade name: "KS-835"], followed by adding toluene to dilute the fluid so that the concentration of solid components was 1.3% by mass. The formed coating film was dried at 150° C. for 1 minute to form a silicone release layer having a thickness of 100 nm, and the second release film was prepared.

(4) Preparation of a Pressure Sensitive Adhesive Sheet

The face of the first release film obtained above in (2) at the side having the silicone release layer was coated with Coating fluid (c) of a pressure sensitive adhesive obtained above in (1) by the knife coating process. After the formed coating film was dried at 90° C. for 1 minute, the face having the silicone release layer of the second release film obtained above in (3) was laminated to the formed coating layer, and a sheet of a pressure sensitive adhesive was prepared. The thickness of the pressure sensitive adhesive layer was 10 μm.

Example 1

The smooth face (Rz of the face containing no fillers: 80 nm; the surface film Young's modulus: 3.46 GPa) of a polyethylene terephthalate film having a thickness of 50 μm [manufactured by TOYOBO Co., Ltd.; the trade name: "A4100"] (hereinafter, referred to as Process film [1]) was coated with Coating fluid (a) for forming an optical recording layer by the gravure coating process. The formed coated film was dried at 90° C. for 1 minute, and an optical recording layer having a process film was prepared as the film for producing a sheet for a multilayer optical recording medium. The thickness of the optical recording layer was 0.6 μm.

Then, the second release film of the pressure sensitive adhesive sheet was peeled. The exposed face of the pressure sensitive adhesive layer in the pressure sensitive adhesive sheet was laminated to the face of the optical recording layer having a process film at the side of the optical recording layer, and a sheet for a multilayer optical recording medium was prepared. The properties of the obtained sheet for a multilayer optical recording medium are shown in Table 1.

Example 2

(1) Preparation of Process Film [2]

The smooth face of a polyethylene terephthalate film having a thickness of 50 μm [manufactured by TOYOBO Co., Ltd.; the trade name: "A4100"] was coated, using a Mayer bar #4, with coating fluid of a heat curable alkyd resin which was obtained by mixing 3 parts by mass of p-toluenesulfonic acid as the catalyst to 100 parts by mass of an alkyd resin [manufactured by HITACHI KASEI POLYMER Co., Ltd.; the trade name: "TESFINE 303"; the concentration of solid components: 20% by mass]. The formed coating film was dried and cured by heating at 140° C. for 1 minute to form a layer of a heat cured resin having a thickness of 100 nm, and Process film [2] was prepared.

Rz of the face of the layer of a heat cured resin (the face for forming an optical recording layer) of Process film [2] was 70 nm, and the surface film Young's modulus of the coating film of the resin was 3.68 GPa.

(2) Preparation of a Sheet for a Multilayer Optical Recording Medium

A sheet for a multilayer optical recording medium was prepared by the same procedures as those conducted in Example 1 except that, in place of Process film [1], Process film [2] obtained above in (1) was coated with Coating fluid (a) for forming an optical recording layer. The properties of the obtained sheet for a multilayer optical recording medium are shown in Table 1.

Example 3

(1) Preparation of a Fluid of a Butadiene-Based Releasing Agent 1,4-Polybutadiene rubber [manufactured by ZEON Corporation; the trade name: "NIPOL 1241"; the content of the cis-1,4-bond 35%] was diluted with toluene, and a dispersion having a concentration of solid components of 0.5% by mass was prepared. Then, an antioxidant [manufactured by CIBA SPECIALTY CHEMICALS K. K.; the trade name: "IRGANOX HP2251"] was added to the dispersion in an amount of 1 part by mass based on 100 parts by mass of the 1,4-polybutadiene rubber in the dispersion, and a fluid of a butadiene-based releasing agent was prepared.

(2) Preparation of Process Film [3]

The smooth face (Rz of the face containing no fillers: 210 nm) of a polyethylene terephthalate film having a thickness of 38 μm [manufactured by MITSUBISHI POLYESTER FILM Corporation; the trade name: "PET38 T-700"] was coated with the fluid of a butadiene-based releasing agent obtained above in (1) using a Mayer bar #4, and the formed coated film was dried by heating at 100° C. for 1 minute. The dried coated film was irradiated with ultraviolet light of 1,320 mJ/cm$^2$ to form a layer of a butadiene-based releasing agent having a thickness of 200 nm, and Process film [3] was prepared.

Rz of the face treated for releasing (the face for forming an optical recording layer) of Process film [3] was 210 nm, and the surface film Young's modulus was 1.42 GPa.

(3) Preparation of a Sheet for a Multilayer Optical Recording Medium

A sheet for a multilayer optical recording medium was prepared by the same procedures as those conducted in Example 1 except that, in place of Process film [1], Process film [3] obtained above in (2) was coated with Coating fluid (a) for forming an optical recording layer. The properties of the obtained sheet for a multilayer optical recording medium are shown in Table 1.

Example 4

A sheet for a multilayer optical recording medium was prepared by the same procedures as those conducted in Example 1 except that a cycloolefin resin film having a thickness of 100 μm [manufactured by ZEON Corporation; the trade name: "ZF16"] (hereinafter, referred to as Process film [4]) was used in place of Process film [1], and the face (Rz: 50 nm; the surface film Young's modulus: 2.61 GPa) exposed by peeling the protective film of the film was coated with Coating fluid (a) for forming an optical recording layer. The properties of the obtained sheet for a multilayer optical recording medium are shown in Table 1.

Example 5

(1) Preparation of a Dispersion of a Resin of the Photocurable Type

A dispersion of a resin of the photocurable type having a concentration of solid components of 38.6% by mass was prepared by adding 1.6 parts by mass of a photopolymerization initiator [manufactured by CIBA SPECIALTY CHEMICALS K. K.; the trade name: "IRGACURE 907"] to 100 parts by mass of a resin of the ultraviolet light curable type [manufactured by NIPPON KAYAKU Co., Ltd.; "KAYANOVA FOP-5000B"; the content of solid components: 80%], followed by diluting the obtained mixture with toluene and methyl ethyl ketone.

(2) Preparation of Process Film [5]

A polyethylene terephthalate film having a thickness of 38 μm [manufactured by MITSUBISHI POLYESTER FILM Corporation; the trade name: "PET38 T-300"] (Rz: 305 nm) was coated with the dispersion of a resin of the photocurable type obtained above in (1) by the gravure coating process, and the formed coated film was dried by heating at 90° C. for 1 minute. The formed coated film was irradiated with ultraviolet light of 500 mJ/cm$^2$ to form a photocured resin layer having a thickness of 5 μm, and Process film [5] was prepared.

Rz of the face of the photocured resin (the face for forming an optical recording layer) of Process film [5] was 10 nm, and the surface film Young's modulus was 10.80 GPa.

(3) Preparation of a Sheet for a Multilayer Optical Recording Medium

A sheet for a multilayer optical recording medium was prepared by the same procedures as those conducted in Example 1 except that Process film [5] obtained above in (2) was used in place of Process film [1], and the face of the photocured resin was coated with Coating fluid (a) for forming an optical recording layer. The properties of the obtained sheet for a multilayer optical recording medium are shown in Table 1.

Example 6

(1) Preparation of Process Film [6]

Process film [6] was prepared by forming a film of indium oxide doped with tin (ITO) having a thickness of 150 nm on a polyethylene naphthalate film having a thickness of 200 μm [manufactured by TEIJIN CHEMICALS Ltd.; the trade name: "TEONEX Q65FA"] (Rz: 92 nm).

Rz of the face of the ITO film (the face for forming an optical recording layer) of Process film [6] was 90 nm, and the surface film Young's modulus was 13.00 GPa.

(2) Preparation of a Sheet for a Multilayer Optical Recording Medium

A sheet for a multilayer optical recording medium was prepared by the same procedures as those conducted in Example 1 except that Process film [6] obtained above in (1) was used in place of Process film [1], and the face of the ITO film was coated with Coating fluid (a) for forming an optical recording layer. The properties of the obtained sheet for a multilayer optical recording medium are shown in Table 1.

Example 7

(1) Preparation of a Barrier Layer Having a Process Film

The smooth face of Process film [1] was coated with Coating fluid (b) for forming a barrier layer by the gravure coating process. The formed coating film was dried at 100° C. for 1 minute, and a barrier layer having a process film as the film for producing a sheet for a multilayer optical recording medium was prepared. The thickness of the barrier layer was 1.0 μm.

(2) Preparation of a Sheet for a Multilayer Optical Recording Medium

The second release film in the pressure sensitive adhesive sheet was peeled. The exposed face of the pressure sensitive adhesive was laminated to the barrier layer having a process film obtained above in (1), and a laminate film was prepared. The barrier layer exposed by peeling the process film was coated with Coating fluid (d) for forming an optical recording layer having a concentration of solid components of 5% by mass which was obtained by dissolving a diarylethene [Manufactured by TOKYO CHEMICAL INDUSTRY Co., Ltd.] as the two-photon absorbing material into methyl isobutyl ketone as the solvent by the spin coating process. The formed coated film was dried at 90° C. for 1 minute to form an optical recording layer having a thickness of 0.6 μm, and a sheet for producing an optical recording medium was prepared. The surface height roughness Rz of the optical recording layer was 53 nm. The properties of the obtained sheet for a multilayer optical recording medium are shown in Table 1.

Comparative Example 1

(1) Preparation of a Fluid of a Butadiene-Based Releasing Agent 1,4-Polybutadiene rubber [manufactured by ZEON Corporation; the trade name: "NIPOL 1241"; the content of the cis-1,4-bond: 35%] was diluted with toluene, and a dispersion having a concentration of solid components of 0.5% by mass was prepared. Then, an antioxidant [manufactured by CIBA SPECIALTY CHEMICALS K. K.; the trade name: "IRGANOX HP2251"] was added to the dispersion in an amount of 1 part by mass based on 100 parts by mass of the 1,4-polybutadiene rubber in the dispersion, and a fluid of a butadiene-based releasing agent was prepared.

(2) Preparation of Process Film [7]

A polyethylene terephthalate film having a thickness of 38 μm [manufactured by MITSUBISHI POLYESTER FILM Corporation; the trade name: "PET38 T-100"] was coated with the fluid of a butadiene-based releasing agent obtained above in (1) using a Mayer bar #4, and the formed coated film was dried by heating at 100° C. for 1 minute. A layer of a butadiene-based releasing agent having a thickness of 50 nm was formed by irradiation with ultraviolet light of 110 mJ/cm$^2$, and Process film [7] was prepared.

Rz of the face treated for releasing of Process film [7] was 987 nm, and the surface film Young's modulus was 0.32 GPa.

(3) Preparation of a Sheet for a Multilayer Optical Recording Medium

A sheet for a multilayer optical recording medium was prepared by the same procedures as those conducted in Example 1 except that Process film [7] obtained above in (2) was used in place of Process film [1], and Coating fluid (a) for forming an optical recording layer was applied. The properties of the obtained sheet for a multilayer optical recording medium are shown in Table 1.

Comparative Example 2

(1) Preparation of a Silicone-Based, Releasing Agent

To 85 parts by mass of a silicone-based releasing agent [manufactured by DOW CORNING TORAY Co., Ltd.; the trade name: "BY24-510"], 2 parts by mass of a catalyst [manufactured by DOW CORNING TORAY Co., Ltd.; the trade name: "BY24-835"] and 2,400 parts by mass of toluene were added, and a fluid of a silicone-based releasing agent (the concentration: 1.2% by mass) was prepared.

(2) Preparation of Process Film [8]

A polyethylene terephthalate film having a thickness of 38 μm [manufactured by MITSUBISHI POLYESTER FILM Corporation; the trade name: "PET38 T-100"] was coated with the fluid of a silicone-based releasing agent obtained above in (1). The formed coated film was dried by heating at 120° C. for 1 minute to form a layer of a silicone-based releasing agent having a thickness of 80 nm, and Process film [8] was prepared. Rz of the face treated for releasing of Process film [8] was 1,090 nm, and the surface film Young's modulus was 0.19 GPa.

(3) Preparation of a Sheet for a Multilayer Optical Recording Medium

Preparation of a sheet for a multilayer optical recording medium was attempted by the same procedures as those conducted in Example 1 except that Process film [8] was used in place of Process film [1]. The coating fluid was markedly repelled, and no optical recording layer could be formed.

smaller than that in Comparative Example 1. In Examples 1 to 7, the contact angle on the surface of the process film was 70 to 95 degrees, and repelling of the coating fluid was absent. In Comparative Example 1, repelling of the coating fluid was present, and Rz of the obtained optical recording layer was great. The process film of Comparative Example 2 showed marked repelling of the coating fluid, and the formation of an optical recording layer could not be achieved.

INDUSTRIAL APPLICABILITY

The sheet for a multilayer optical recording medium of the present invention enables to produce a multilayer optical recording medium having a repeating structure in which a plurality of optical recording layers are laminated with excellent precision and quality.

The invention claimed is:

1. A film for producing a sheet for a multilayer optical recording medium, said sheet having a repeating structure comprising a plurality of laminated optical recording layers, wherein the sheet has a structure comprising a unit in which an optical recording layer and an adhesive layer are laminated or a structure comprising a unit in which an optical recording layer, a barrier layer and an adhesive layer are laminated in this order, and a maximum height roughness (Rz) of the

TABLE 1

| | Process film | | Maximum height roughness [Rz] of optical recording layer or barrier layer (nm) | Haze value (%) |
|---|---|---|---|---|
| | maximum height roughness [Rz] (nm) | surface film Young's modulus (GPa) | | |
| Example 1 | 80 | 3.46 | 85 | 1.1 |
| Example 2 | 90 | 3.68 | 78 | 1.0 |
| Example 3 | 210 | 1.42 | 205 | 2.0 |
| Example 4 | 50 | 2.61 | 52 | 1.0 |
| Example 5 | 10 | 10.80 | 17 | 1.1 |
| Example 6 | 90 | 13.00 | 92 | 1.4 |
| Example 7 | 80 | 3.46 | 87 | 0.9 |
| Comparative Example 1 | 987 | 0.32 | 804 | 4.0 |
| Comparative Example 2 | 1090 | 0.19 | —* | |

| | Number of bright spots (/$10^4$ μm²) | Fraction of residual components (%) | Peeling strength (mN/25 cm) | Contact angle (degree) | Repelling |
|---|---|---|---|---|---|
| Example 1 | 1 | 0.0 | 100 | 70 | absent |
| Example 2 | 2 | 4.0 | 78 | 76 | absent |
| Example 3 | 32 | 7.0 | 52 | 95 | absent |
| Example 4 | 4 | 0.0 | 80 | 85 | absent |
| Example 5 | 4 | 0.0 | 84 | 74 | absent |
| Example 6 | 10 | 0.0 | 175 | 32 | absent |
| Example 7 | 1 | — | 102 | 70 | absent |
| Comparative Example 1 | 63 | 19.0 | 800 | 101 | present |
| Comparative Example 2 | —* | | | 109 | present |

* Formation of an optical recording layer could not be achieved.

As shown in Table 1, in Examples 1 to 7, the haze value was smaller and the number of the bright spots was smaller than those in Comparative Example 1, and the results in Examples 1 to 7 passed the test. The fraction of residual components was small, i.e., smaller than 10%, and the peeling strength was optical recording layer or the barrier layer is 500 nm or smaller, wherein the optical recording layer or the barrier layer is disposed on a process film on a face at a side for forming the optical recording layer or at a side for forming the barrier layer, the face at the side for forming the optical recording layer or at the side for forming the barrier layer of the process film having a maximum height roughness (Rz) of 500 nm or smaller.

2. The film according to claim 1, wherein, in the sheet having a structure comprising a unit in which an optical recording layer and an adhesive layer are laminated, the optical recording layer is formed by transfer of an optical recording layer formed on the process film on a face at a side for forming the optical recording layer.

3. The film according to claim 1, wherein, in the sheet having a structure comprising a unit in which an optical recording layer, a barrier layer and an adhesive layer are laminated, the barrier layer is formed by transfer of a barrier layer formed on the process film on a face at a side for forming the barrier layer.

4. The film according to claim 2, wherein a surface film Young's modulus on the face of the process film at the side for forming the optical recording layer or at the side for forming the barrier layer is 1.0 GPa or greater.

5. The film according to claim 2, wherein the face of the process film at the side for forming the optical recording layer or at the side for forming the barrier layer does not comprise a filler.

6. The film according to claim 2, wherein the process film comprises a substrate film and a coating film disposed on the substrate film, and the coating film has a thickness of 80 to 10,000 nm and is disposed on the face of the process film at the side for forming the optical recording layer or at the side for forming the barrier layer to suppress roughness of the substrate.

7. The film according to claim 2, wherein the face of the process film at the side for forming the optical recording layer or at the side for forming the barrier layer comprises a coating film comprising a polyester-based resin or a resin cured with an active energy ray.

8. The film according to claim 1, wherein the optical recording layer is a layer comprising a multiphoton absorbing material.

9. The film according to claim 3, wherein a surface film Young's modulus on the face of the process film at the side for forming the optical recording layer or at the side for forming the barrier layer is 1.0 GPa or greater.

10. The film according to claim 3, wherein the process film comprises a substrate film and a coating film disposed on the substrate film, and the coating film has a thickness of 80 to 10,000 nm and is disposed on the face of the process film at the side for forming the optical recording layer or at the side for forming the barrier layer to suppress roughness of the substrate.

11. The film according to claim 4, wherein the process film comprises a substrate film and a coating film disposed on the substrate film, and the coating film has a thickness of 80 to 10,000 nm and is disposed on the face of the process film at the side for forming the optical recording layer or at the side for forming the barrier layer to suppress roughness of the substrate.

12. The film according to claim 5, wherein the process film comprises a substrate film and a coating film disposed on the substrate film, and the coating film has a thickness of 80 to 10,000 nm and is disposed on the face of the process film at the side for forming the optical recording layer or at the side for forming the barrier layer to suppress roughness of the substrate.

13. The film according to claim 3, wherein the face of the process film at the side for forming the optical recording layer or at the side for forming the barrier layer comprises a coating film comprising a polyester-based resin or a resin cured with an active energy ray.

14. The film according to claim 4, wherein the face of the process film at the side for forming the optical recording layer or at the side for forming the barrier layer comprises a coating film comprising a polyester-based resin or a resin cured with an active energy ray.

15. The film according to claim 5, wherein the face of the process film at the side for forming the optical recording layer or at the side for forming the barrier layer comprises a coating film comprising a polyester-based resin or a resin cured with an active energy ray.

16. The film according to claim 6, wherein the face of the process film at the side for forming the optical recording layer or at the side for forming the barrier layer comprises a coating film comprising a polyester-based resin or a resin cured with an active energy ray.

* * * * *